United States Patent [19]
Krane

[11] Patent Number: 5,487,223
[45] Date of Patent: Jan. 30, 1996

[54] LINEAR SCALE

[76] Inventor: Anthony E. Krane, 4070 Meadowbrook Blvd., University Heights, Ohio 44118

[21] Appl. No.: 321,743

[22] Filed: Oct. 12, 1994

[51] Int. Cl.$^6$ ........................................ G01B 3/02
[52] U.S. Cl. ........................................ 33/494; 33/483
[58] Field of Search .......................... 33/42, 483, 494, 33/479, 566, 476

[56] References Cited

U.S. PATENT DOCUMENTS

| | | | |
|---|---|---|---|
| 700,023 | 5/1902 | Duby | 33/42 |
| 732,379 | 6/1903 | Shireman | 33/42 |
| 828,375 | 8/1906 | Breul | 33/42 |
| 844,243 | 2/1907 | Breul | 33/42 |
| 861,799 | 7/1907 | Breil | 33/494 |
| 999,730 | 8/1911 | Allen . | |
| 1,135,259 | 4/1915 | Cokely | 33/42 |
| 2,579,664 | 12/1951 | Gleasman . | |
| 2,959,862 | 11/1960 | Jager | 33/494 |
| 4,503,624 | 3/1985 | Whiteford | 33/42 |

FOREIGN PATENT DOCUMENTS

| | | | |
|---|---|---|---|
| 728858 | 3/1966 | Canada | 33/494 |
| 15633 | 6/1912 | United Kingdom . | |

*Primary Examiner*—Thomas B. Will
*Attorney, Agent, or Firm*—Pearne, Gordon, McCoy & Granger

[57] ABSTRACT

A scale, such as a tape measure, is provided with a plurality of slots corresponding to graduations on the scale. The slots are alternatingly located on opposed edges of the scale, and edges of each slot are collinear with edges of opposing slots. When measuring a distance to a line or a point, the line or point will appear in only one of the slots. The slots are tapered to a point at a specific graduation.

11 Claims, 1 Drawing Sheet

5,487,223

LINEAR SCALE

BACKGROUND OF THE INVENTION

1. Field of the Invention

This invention relates generally to the field of measuring linear distances and specifically to a slotted scale.

2. Description of the Related Art

Graduated scales used to measure distances probably predate recorded history. The precision and accuracy of the scale depend on the fineness of the graduations and the skill of the user. Inaccuracies may arise from parallax or misreading of graduations by the user. Marking every graduation on a scale clutters the scale. Therefore scales are frequently provided with unidentified graduations, thereby requiring knowledge of fractions to read the scale accurately when using the venerable English system. Even users who possess such knowledge commonly make erroneous readings or conversions of fractions.

Different scales have been developed to reduce the clutter of graduations or improve accuracy in reading the scale. Examples of scales are shown in G.B. Patent No. 15,633 to Allen, and U.S. Pat. Nos. 861,799 to Breil, 999,730 to Allen, and 2,579,664 to Gleasman. However, a need remains to further improve the accuracy and reduce the likelihood of errors resulting from inadequate knowledge of fractions or mistaken calculations. Also needed is a scale that is easier to use when measuring or marking distances.

SUMMARY OF THE INVENTION

The present invention provides an improved scale having windows, such as slots, uniquely located at each distance to be measured. The slots do not overlap, but allow readings at all desired distances from a reference. The scale has an elongated body having opposed scale edges. A plurality of slots through the body are each located a specified sequential distance from a reference point. Each slot has opposed slot edges. The slots are alternatingly located along opposed scale edges such that one of the slot edges of each of the slots is collinear with one of the slot edges of an opposite one of the slots and the other of the slot edges of each of the slots is collinear with one of the slot edges of another opposite one of the slots. That is, one of the slot edges of each of the slots is collinear with one of the slot edges of a successive, opposite one of the slots.

The scale edges are parallel and provided with numeral graduations identifying specified fractions of integral distances of the slots. The opposed slot edges are parallel and each slot tapers to a point at the specified distance.

The invention also provides a method of measuring with the scale described. The steps include placing the reference point of the scale at a first end of a distance to be measured; locating a second end of a distance to be measured in one of the slots; and determining the distance to be measured from the graduation of the slot in which the second end is located.

With the present invention, precision and accuracy of measuring linear distances are improved and the measurement process is simplified.

DESCRIPTION OF THE PREFERRED EMBODIMENTS

Figure 1:
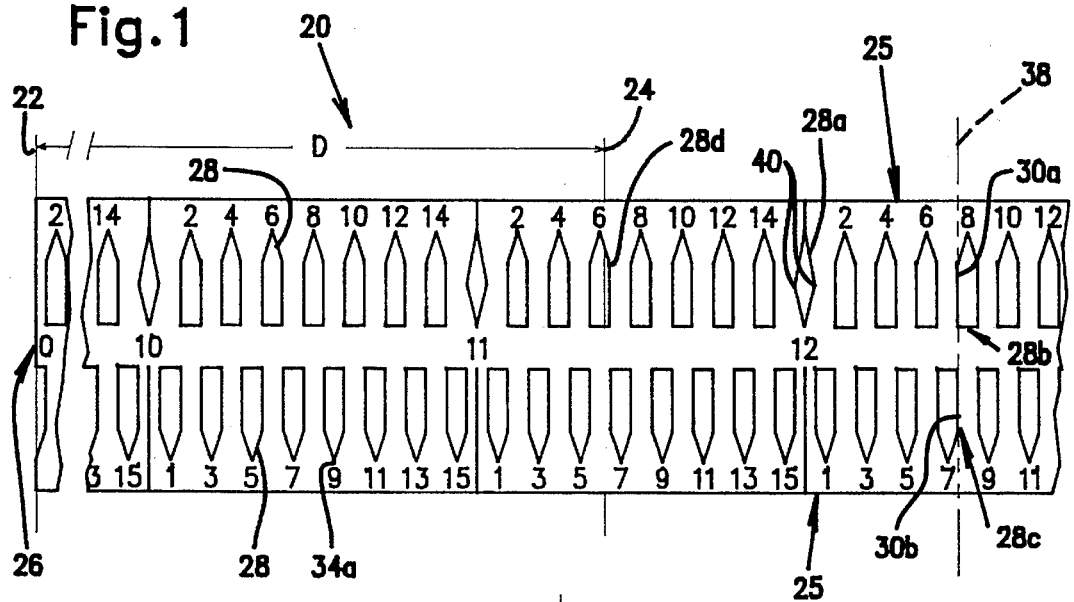
FIG. 1 shows a fragmentary plan view of a scale according to the invention.

Referring to FIG. 1, a scale 20 is provided for measuring a distance D between two points or lines 22, 24, which may be marks, edges of objects or other elements denoting locations or boundaries. (The scale 20 and distance D are broken in FIG. 1 for clarity.) A body of the scale 20 has a generally elongated rectangular shape and may be made of any suitable inelastic durable, flexible or rigid material, such as nylon or steel. The scale 20 is relatively thin, its thickness depending on the application and desired rigidity. Along generally parallel opposed scale edges 25, the scale 20 includes a series of graduations corresponding to distances from an end 26 or other reference point of the scale. In the scale shown in FIG. 1, the graduations correspond to inches and sixteenths of each inch. For example, the numeral 10 is ten inches from the end 26 of the scale. The odd numerals below and to the right of the 10 correspond to 10 1/16 10 3/16", ... 10 15/16. Similarly, the even numerals above and to the right of the 10 correspond to 10 2/16" 10 4/16", ... 10 14/16.

Each of the numerals is provided with a corresponding window, such as a slot 28. Each slot extends entirely through the scale 20. In the embodiment shown, integer values of inches are provided with differently shaped slots 28a (a diamond in this case) for differentiation, but all slots can have the same shape. In an alternative embodiment, the slots can be virtual slots, such as transparent windows having the characteristic locations and geometry described below. In another embodiment, the entire scale 20 can be transparent, the slots being defined by opaque demarcations on the scale.

Figure 2:
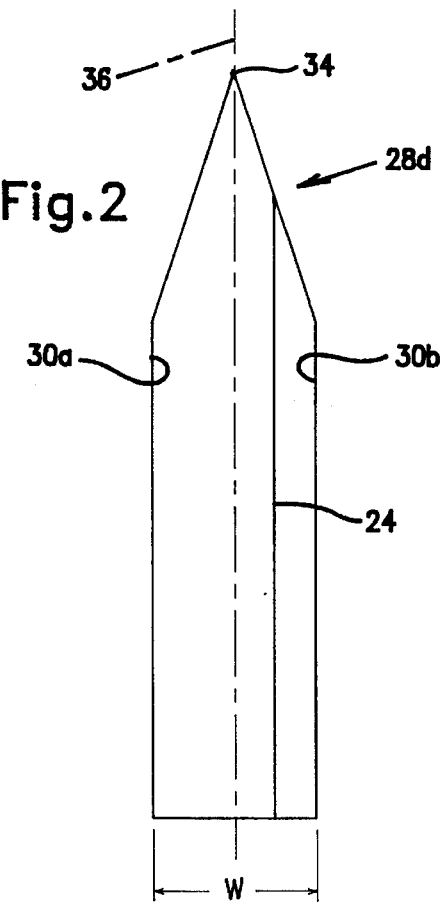
FIG. 2 shows a detailed view of a slot in the scale.

Referring to FIGS. 1 and 2, the slots 28 corresponding to fractional values have left and right opposed, parallel slot edges 30a, 30b. At one end, the slot 30 tapers to a point 34 at a corresponding dimensional location. That is, the point 34a is 10 9/16 inches from the end 26 of the scale. The width of the slot W corresponds to the smallest graduation of the scale, in this case 1/16 of an inch. The opposed slot edges 30 are equally spaced from a centerline 36 through the point 34, in this case 1/32 of an inch. Other slot shapes may also be suitable.

As shown in FIG. 1, the slots 28 are alternatingly located on opposite scale edges 25 at specified sequential distances from the end 26. With the given definitions on the dimensions and locations of the slots 28, slot edges 30, and points 34, it is apparent that a slot edge of one slot is collinear with a slot edge of an opposite slot. For example, the left slot edge 30a of one slot 28b is on a line 38 with the right slot edge 30b of one adjacent slot 28c. Each slot 28 is similarly located so that none of the slots overlap and every linear dimension from the end 26 is exposed to one slot 28 or falls exactly on an edge 30 of two slots. Ends of the scale 20 may be provided with partial slots or no slots. Slots 28 may be located from a reference point that is not necessarily at the end of the scale. Where other shapes are used for the slots 28a, for integer values for example, side points 40 or edges should align with corresponding edges 30 of adjacent slots 28.

In use, the end 26 of the scale 10 is placed at one end of the dimension to be measured, for example, the first line 22. The other end of the dimension, for example, the second line 24, appears in one of the slots 28d (or in one of the transparent windows defining the virtual slot). By reading the 11 and the 6 corresponding to the slot 28d, the user can quickly determine that the distance D is 11 6/16 inches. As shown in FIG. 2, the line 24 is not aligned with the point 34. Thus, the distance D is not exactly 11 6/16 inches, but slightly more. However, because the width W of the slot 28*d* is 1/16, the maximum error is 1/32 of an inch. With some estimation and knowledge of fractions, the precision can be improved. For example, the line 24 is about midway between the right edge 30*b* and the centerline 36, thus, the distance D is approximately 11 25/64 inches. Accordingly, the precision is nearly quadrupled by estimation.

If a line were to be exactly collinear with the edge 30*b*, then the distance D would be 11 13/32 inches. However, without calculating the fraction, a reading of 11 6/16 or 11 7/16 inches would be in error by only 1/32 of an inch.

The invention also comprehends a novel measuring system using the scale. Distances do not need to be read as fractions; instead the denominator can be omitted and the distance D can be identified as 11,6 according to a standardized fractional value. Instead of using thirty seconds, locations near the edges can be denoted by "+" and "−" or some other designation. For example, the distance D would be 11,6+. The system thereby simplifies the designations and reduces apprehension for users with math anxiety.

The scale also allows improved simplicity and accuracy in marking distances. A pencil mark at the point 34 makes an easy to read "V" or "crow's foot," rather than an ambiguous hash mark common when a conventional scale is used. In addition, the accuracy and precision discussed above can be achieved by marking along one of the slot edges 30, where appropriate. In fact, the slots 28 may be slightly wider than described above to allow for the width of a pencil lead while remaining within the scope of collinear for the purposes of the invention. Of course, such marking is not possible with virtual slots.

The present disclosure describes several embodiments of the invention, however, the invention is not limited to these embodiments. Other variations are contemplated to be within the spirit and scope of the invention and appended claims. For example, the scale can be graduated for different units or only selected distances for specialized applications. Also, the scale can be graduated for different measuring systems or different precision. The scale can be a rigid bar or a flexible tape. A flexible tape can have a catch at the end to define the reference and can be retractable into a housing.

What is claimed is:

1. A scale, comprising:

an elongated body having opposed scale edges; and a plurality of slots through the body, each of said slots being located a specified sequential distance from a reference point, each of said slots having opposed slot edges, and said slots being alternatingly located along said opposed scale edges such that one of the slot edges of each of the slots is collinear with one of the slot edges of an opposite one of the slots and the other of the slot edges of each of the slots is collinear with one of the slot edges of another opposite one of the slots.

2. A scale according to claim 1, wherein the scale edges are parallel.

3. A scale according to claim 1, further comprising graduations identifying the specified distances of the slots.

4. A scale according to claim 3, wherein the graduations comprise numerals corresponding to fractions of integral distances.

5. A scale according to claim 1, wherein the opposed slot edges are parallel.

6. A scale according to claim 1, wherein each of said slots has a point at the specified distance.

7. A scale according to claim 1, wherein each of said slots tapers to a point at the specified distance.

8. A scale, comprising:

an elongated body having opposed scale edges; and a plurality of slots through the body, each of said slots being located a specified sequential distance from a reference point, each of said slots having opposed slot edges, and said slots being alternatingly located along said opposed scale edges such that one of the slot edges of each of the slots is collinear with one of the slot edges of a successive, opposite one of the slots.

9. A scale, comprising:

an elongated body having opposed, generally parallel scale edges; and a plurality of slots through the body, each of said slots being located a specified sequential distance from a reference point, each of said slots having a pair of opposed parallel slot edges and a point at the specified distance, and said slots being alternatingly located along said opposed scale edges such that one of the slot edges of each of the slots is collinear with one of the slot edges of an opposite one of the slots and the other of the slot edges of each of the slots is collinear with one of the slot edges of another opposite one of the slots.

10. A method of measuring with a scale having an elongated body having opposed parallel scale edges; and a plurality of slots through the body, each of said slots being located a specified sequential distance from a reference point, each of said slots having opposed slot edges, and said slots being alternatingly located along said opposed scale edges such that one of the slot edges of each of the slots is collinear with one of the slot edges of an opposite one of the slots and the other of the slot edges of each of the slots is collinear with one of the slot edges of another opposite one of the slots; and graduations identifying the specified distances of the slots, comprising the steps of:

placing the reference point of the scale at a first end of a distance to be measured;

locating a second end of a distance to be measured in one of the slots; and determining the distance to be measured from the graduation of the slot in which the second end is located.

11. A scale, comprising:

an elongated body having opposed scale edges; and a plurality of windows through the body, each of said window being located a specified sequential distance from a reference point, each of said window having opposed window edges, and said windows being alternatingly located along said opposed scale edges such that one of the window edges of each of the windows is collinear with one of the window edges of an opposite one of the windows and the other of the window edges of each of the windows is collinear with one of the window edges of another opposite one of the windows.

* * * * *